3-24-1874
Re
5,809
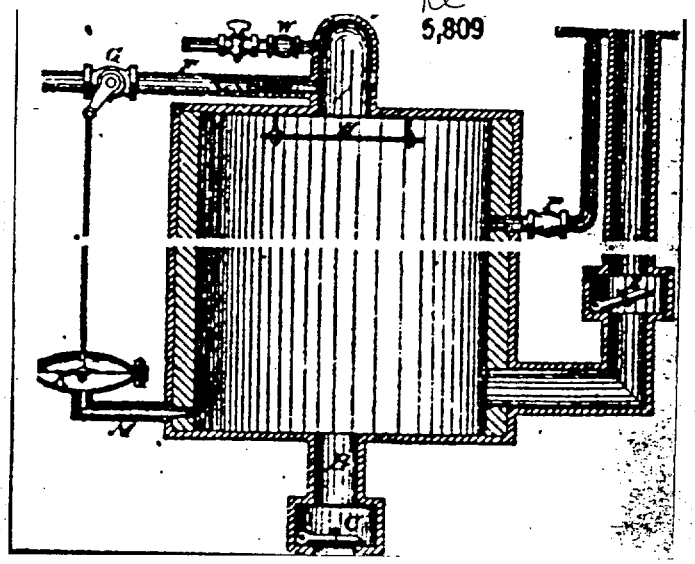

UNITED STATES PATENT OFFICE.

WILLIAM E. PRALL, OF WASHINGTON, DISTRICT OF COLUMBIA.

IMPROVEMENT IN STEAM VACUUM-PUMPS.

Specification forming part of Letters Patent No. 116,751, dated July 4, 1871; reissue No. 5,123, dated October 29, 1872; reissue No. 5,809, dated March 24, 1874; application filed December 26, 1873.

*To all whom it may concern:*

Be it known that I, WILLIAM EDGAR PRALL, of the city of Washington, in the District of Columbia, have invented certain Improvements in Steam Vacuum-Pumps, of which the following is a specification:

My invention relates to that class of steam-pumps in which the water is drawn into the pump by means of a condensation of steam therein, and expelled by an admission of steam thereto. It consists in combining with a working chamber of the pump and its steam-induction port, and with a suitable valve controlling the port, a movable piece carrying the valve, so that the two shall move together, and covering an opening into the chamber or into a space or passage communicating therewith, to resist and confine, in common with the walls of said chamber, pressure exerted therein, and to be carried inwardly by means of an exhaust of steam through or its condensation at or within the discharge port or pipe of the chamber, for the purpose of cutting off by said inward movement the admission of steam to said chamber, the object of my invention being to utilize the reduction of pressure produced in the pump by the exhaust and condensation of the steam admitted thereto, as a means for controlling, automatically, such an admission of steam. The movable piece may consist of a diaphragm so secured as to permit a movement of some portion thereof, or it may consist of a piston or piece moving bodily.

The accompanying drawing represents, in section, a simple vacuum-pump fitted with my invention.

In said drawing, A is a cylinder or chamber of the pump; B, its induction or suction pipe, fitted with a check-valve, C, of any approved form; and D, its discharge-pipe, also provided with a suitable check-valve, E. F is a pipe from the steam-boiler, communicating with upper end of chamber A, and provided with a suitable cut-off valve, G. H is a deflecting-plate secured within the chamber A, opposite the mouth of the steam-pipe F, to deflect and distribute the current of steam entering the chamber. K is a movable piece, consisting of a flexible diaphragm, confined at its edges between an upper and lower plate, L and L′, which form a casing therefor, said plates being concaved or hollowed out on their inner sides sufficiently to permit the center of the movable piece to move between them at right angles to its plane to an extent proportioned to the amount of play required to open and close the cut-off valve G. The upper plate L is perforated centrally. To the lower plate L′ is attached a small open pipe, connecting the space or compartment on the inner side of the movable piece with the interior of the chamber A, so that said space becomes virtually a part of the interior of said chamber, and the movable piece is thus made to intervene between the interior and exterior thereof, and by covering and closing the opening in the plate L, as well as the opening in the plate L′, to resist and confine at this point any pressure exerted within the chamber. N is a rod secured centrally to the movable piece K, and which extends thence outwardly through the opening in the plate L to the steam cut-off valve G, the connection being so made and adjusted as that when the movable piece is carried outwardly by an excess of pressure upon its inner side or face the valve shall be thrown open, and when the movable piece is drawn or carried inwardly under the influence of a reduction of pressure produced within the chamber, the valve shall be closed. P is a small pipe which connects with the discharge-pipe D, opens into the upper part of the chamber A, and is fitted with check-valve to prevent an escape of steam through it from the chamber. This pipe serves to deliver an injection of water from the discharge-pipe, to complete the condensation of steam in the chamber so soon as its pressure has been reduced below that of the column of water in said discharge-pipe. A simple air-valve, W, is combined with the chamber A to admit air thereto during the occurrence of a vacuum therein.

I do not confine myself to any particular position or arrangement of the movable piece covering an outward opening and controlling the admission of steam, as it can be placed in connection with any part of the machine where the force of the steam and vacuum will cause it to move.

In the operation of my invention the movable piece K is carried inwardly, and operates thereby, automatically, to close the steam-induction port whenever, in the discharge of the water from the chamber A, the steam reaches the eduction-port and discharge-pipe D, because of the instant reduction of pressure in the chamber naturally consequent upon the sudden vent of the steam into the said eduction-port and pipe, and its condensation in contact with the surface of said pipe and its valve E.

In a pump constructed with a single chamber, as herein described, the outward position of the movable piece K′ against the opening in the plate L is maintained by the pressure of the water or steam within the chamber A, communicated through the pipe M to said movable piece K′, until the water is so far discharged from the chamber as to admit a vent of steam into the discharge-pipe, whereupon the pressure in the chamber becomes reduced, as above described, and causes an inward movement of the movable piece, which will operate to close the valve G and cut off the steam. Simultaneously, or nearly so, with this movement of the valve, an injection of water takes place from the discharge-pipe through the pipe P, the which, completing the condensation of the steam remaining in the chamber, produces a vacuum, which causes the chamber to fill with water from the suction-pipe. The diaphragm will then move outwardly again, and the operation of the pump be thus repeated, as above, and automatically continued so long as steam is supplied thereto.

I claim as my invention—

1. The method, substantially as herein described, of cutting off the admission of steam to a working-chamber in a steam vacuum-pump, by combining with its steam-induction port and a valve controlling the same, and with an opening between the interior and exterior of the chamber, a movable piece carrying said valve, and arranged to move inwardly, and thereby close the steam-port upon a reduction of pressure in said chamber, substantially as set forth.

2. In combination with a working-chamber of a steam vacuum-pump, its steam-induction port, and a valve controlling the same, a movable piece carrying the valve, and covering an opening in said chamber, to resist and confine pressure exerted within the chamber, and be carried inwardly when such pressure is reduced, substantially as and for the purpose herein set forth.

W. E. PRALL.

Witnesses:
DAVID A. BURR,
J. W. HAMILTON JOHNSON.